G. R. WIGHT.
Mucilage-Bottle.
No. 8,347. Reissued July 23, 1878.
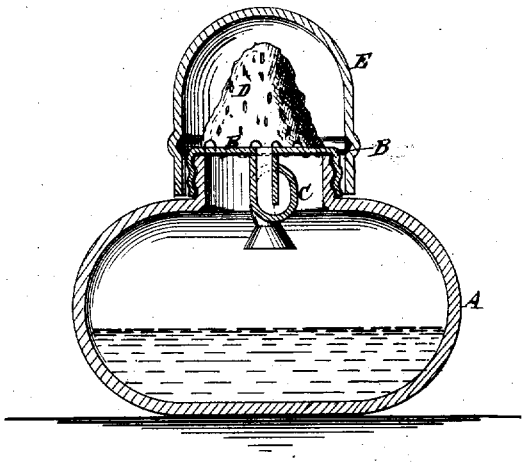
WITNESSES:
A. W. Almquist
John Goethals
INVENTOR:
G. R. Wight
BY
Munn & Co.
ATTORNEYS.
N. PETERS, PHOTO-LITHOGRAPHER, WASHINGTON, D. C.

UNITED STATES PATENT OFFICE.

GEORGE R. WIGHT, OF NEW YORK, N. Y.

IMPROVEMENT IN MUCILAGE-BOTTLES.

Specification forming part of Letters Patent No. 172,536, dated January 18, 1876; Reissue No. 8,347, dated July 23, 1878; application filed March 25, 1876.

*To all whom it may concern:*

Be it known that I, GEORGE R. WIGHT, of the city, county, and State of New York, have invented a new Improvement in Mucilage-Bottles, of which the following is a specification:

The figure is a vertical section of my improved mucilage-bottle.

The object of this invention is to furnish an improved mucilage-bottle which shall be so constructed that the mucilage may be applied without a brush or any detached instrument, and which will prevent the mucilage from spilling or running out should the bottle be overturned.

The subject-matter claimed will be hereinafter specifically designated.

A represents the bottle or cup, which may be of any desired size, shape, or style. Upon the neck of the bottle A is formed a screw-thread to receive the screw-thread formed upon the inner surface of the flange of the metallic cap B. In the center of the cap B is formed a hole, in which is secured the upper end of a small tube, C. The tube C is bent into S shape, so as to serve as a cut-off or trap to prevent the air from entering the bottle and keep the mucilage close to the sponge to keep the said sponge moist. D is a sponge, cut into a tapering or conical form, and the base of which is secured to the cap B by sewing or other convenient means, a number of small holes being formed through the said cap B for convenience in securing said sponge D permanently in place. E is a cap, which is made of such a size as to cover the said sponge D without touching it, and which fits snugly and air-tight upon the outer surface of the cap B.

In using the device, the sponge D should be kept moist with water to enable the mucilage to pass through it freely.

To apply mucilage with this device, the cap E is removed, the bottle is inverted, and the sponge D is rubbed over the place to which the mucilage is to be applied, care being taken to replace the cap E, to prevent the sponge from becoming dry and stiff.

Having thus described my invention, what I claim as new, and desire to secure by Letters Patent, is—

1. The combination of the metallic cap B, provided with the S-tube C and the sponge D, with the neck of a mucilage-bottle, A, substantially as herein shown and described.

2. The cap for mucilage-bottles, constructed substantially as hereinbefore set forth, provided with a cut-off or trap, which allows the mucilage to flow out freely, but retains a portion of the mucilage to prevent the entrance of air to the bottle when not in use.

GEORGE R. WIGHT.

Witnesses:
JAMES T. GRAHAM,
JAMES H. HUNTER.